US011932048B2

(12) United States Patent
Kim et al.

(10) Patent No.: US 11,932,048 B2
(45) Date of Patent: Mar. 19, 2024

(54) PIGMENT-TYPE HOT STAMPING FOIL, METHOD OF MANUFACTURING SAME, AND HOT-STAMPED MEMBER INCLUDING PIGMENT-TYPE HOT STAMPING FOIL

(71) Applicant: GEOCHEM CO., LTD., Paju-si (KR)

(72) Inventors: Juwon Kim, Paju-si (KR); Yukyung Shin, Paju-si (KR); Wonkyu Na, Goyang-si (KR)

(73) Assignee: GEOCHEM CO., LTD., Paju-si (KR)

( * ) Notice: Subject to any disclaimer, the term of this patent is extended or adjusted under 35 U.S.C. 154(b) by 0 days.

(21) Appl. No.: 18/213,532

(22) Filed: Jun. 23, 2023

(65) Prior Publication Data

US 2023/0398810 A1 Dec. 14, 2023

Related U.S. Application Data

(63) Continuation of application No. PCT/KR2021/011584, filed on Aug. 30, 2021.

(30) Foreign Application Priority Data

Apr. 22, 2021 (KR) ........................ 10-2021-0052683

(51) Int. Cl.
*B44C 1/17* (2006.01)
*B41M 3/12* (2006.01)

(52) U.S. Cl.
CPC ............. *B44C 1/1716* (2013.01); *B41M 3/12* (2013.01); *B44C 1/1729* (2013.01)

(58) Field of Classification Search
CPC ..... B44C 1/1712; B44C 1/1716; B44C 1/172; B44C 1/1725; B44C 1/1729; B41M 3/12
See application file for complete search history.

(56) References Cited

U.S. PATENT DOCUMENTS 5,053,260 A 10/1991 Brehm ............................ 428/40
2005/0118537 A1 6/2005 Lutz et al. .................... 430/338
2018/0326718 A1 11/2018 Unal et al. .......... B41F 16/0013

FOREIGN PATENT DOCUMENTS

CN 105922782 A 9/2016
EP 0 945 280 A2 9/1999

*Primary Examiner* — Gerard Higgins
(74) *Attorney, Agent, or Firm* — Stein IP, LLC

(57) ABSTRACT

Proposed are a pigment-type hot stamping foil, a method of manufacturing the same, and a hot-stamped member including the pigment-type hot stamping foil. The pigment-type hot stamping foil includes a carrier film layer, a release layer formed on a lower surface of the carrier film layer, a pigment-type colored coloring layer formed on a lower surface of the release layer, a pigment-type white coloring layer formed on a lower surface of the pigment-type colored coloring layer, a primer layer formed on a lower surface of the pigment-type white coloring layer, a metal deposition layer formed on a lower surface of the primer layer, and an adhesive layer formed on a surface of the metal deposition layer.

2 Claims, 4 Drawing Sheets

PIGMENT-TYPE HOT STAMPING FOIL, METHOD OF MANUFACTURING SAME, AND HOT-STAMPED MEMBER INCLUDING PIGMENT-TYPE HOT STAMPING FOIL

CROSS-REFERENCE TO RELATED APPLICATIONS

This application is a bypass continuation of International Application No. PCT/KR2021/011584, filed Aug. 30, 2021, which claims the benefit of Korean Application No. 10-2021-0052683, filed Apr. 22, 2021, in the Korean Intellectual Property Office. All disclosures of the documents named above are incorporated herein by reference.

TECHNICAL FIELD

The present disclosure relates to a hot stamping foil with excellent color expression and opacity performance. More particularly, the present disclosure relates to a pigment-type hot stamping foil with excellent color expression and opacity performance, and a method of manufacturing the same.

BACKGROUND ART

Stamping foils are media materials for dry printing and representative examples thereof are hot stamping foil and cold foil. Hot stamping is a printing method in which a desired image is transferred to a surface from a foil by means of heat and pressure.

Stamping foils can be divided into hot stamping foils, cold foils, digital foils, etc. depending on the method used to transfer foils, and can be divided into metallic foils, such as a gold foil and a silver foil, holographic foils, pigment foils, etc. depending on color and pattern.

A general production process for manufacturing metallic foils involves printing a release layer and a coloring layer on a carrier film (mainly PET) through a gravure printing method, forming a metal deposition layer thereon to provide metallic effects, forming an adhesive layer thereon, and performing cutting.

The metallic foils exhibit an excellent transparency after transfer because the coloring layer positioned on the metal deposition layer is formed from dyes, thereby revealing a metallic texture under the coloring layer. The metallic foils can express a variety of colors by forming the coloring layer from dyes of various colors. Holographic foils are manufactured in the same manner as in the metallic foils except for a hologram process.

Meanwhile, pigment foils are manufactured by forming a coloring layer from pigments on a release layer, and then directly forming an adhesive layer thereon without forming a metal deposition layer. This is because colors of the coloring layer, especially light colors expressed by pigments, are faded due to metallic penetration during metal deposition.

However, the pigment foils are affected by the color of a substrate to be stamped due to poor opacity performance thereof, which is problematic. For example, when a bright yellow color is stamped on a light colored substrate, for example, white paper, color fading due to the substrate does not occur, so a bright yellow color is clearly expressed after transfer. On the other hand, when a bright yellow color is printed on a substrate having a dark color such as ultramarine blue or black, there is a problem in that color expression is lowered due to the influence of the substrate to be stamped.

As a solution to this problem, a method of increasing the thickness of a coloring layer of pigment foils has been proposed. However, this approach is still limited in that colorability is improved by the increased thickness of the coloring layer, whereas the coloring layer is damaged during processing such as cutting due to the increased thickness.

DISCLOSURE

Technical Problem

Accordingly, the present disclosure has been made keeping in mind the above problems occurring in the related art, and an objective of the present disclosure is to provide a novel pigment-type hot stamping foil having improved opacity performance to exhibit excellent color expression even on dark colored substrates.

Another objective of the present disclosure is to provide a method of manufacturing a novel pigment-type hot stamping foil having improved opacity performance to exhibit excellent color expression even on dark colored substrates.

Still another objective of the present disclosure is to provide a hot-stamped member including a light colored pigment-type hot stamping foil stamped on a surface of a dark colored substrate.

Technical Solution

In order to accomplish the above objectives, according to one aspect of the present disclosure, there is provided a hot stamping foil including: a carrier film layer; a release layer formed on a lower surface of the carrier film layer; a pigment-type colored coloring layer formed on a lower surface of the release layer; a pigment-type white coloring layer formed on a lower surface of the pigment-type colored coloring layer; a primer layer formed on a lower surface of the pigment-type white coloring layer; a metal deposition layer formed on a lower surface of the primer layer; and an adhesive layer formed on a surface of the metal deposition layer.

According to another aspect of the present disclosure, there is provided a method of manufacturing a hot stamping foil, the method including: providing a carrier film layer; forming a release layer on a lower surface of the carrier film layer; forming a pigment-type colored coloring layer on a lower surface of the release layer; forming a pigment-type white coloring layer on a lower surface of the pigment-type colored coloring layer; forming a primer layer on a lower surface of the pigment-type white coloring layer; forming a metal deposition layer on a lower surface of the primer layer; and forming an adhesive layer on a lower surface of the metal deposition layer.

According to still another aspect of the present disclosure, there is provided a hot-stamped member including a pigment-type hot stamping foil, the hot-stamped member including: a substrate; an adhesive layer formed on an upper surface of the substrate; a metal deposition layer formed on an upper surface of the adhesive layer; a primer layer formed on an upper surface of the metal deposition layer; a pigment-type white coloring layer formed on an upper surface of the primer layer; a pigment-type colored coloring layer formed on an upper surface of the pigment-type white coloring layer; and a release layer formed on an upper surface of the pigment-type colored coloring layer.

As used herein, the term "pigment-type" means that a pigment is used rather than a dye to express a color or a white color of a coloring layer or a white coloring layer.

As used herein, the term “color” may refer to as a color including white or fluorescent color.

Although not limited in theory, it is believed that the pigment-type hot stamping foil according to the present disclosure can express the original color thereof even on a dark colored substrate by employing a layered structure in which the metal deposition layer is formed under the pigment-type colored coloring layer to block the influence of the color of the substrate on the pigment-type colored coloring layer, the pigment-type white coloring layer is formed under the pigment-type colored coloring layer to block the metal deposition layer from affecting the pigment-type colored coloring layer to thereby prevent the color expression of the pigment-type colored coloring layer from being deteriorated by the metal deposition layer, and the primer layer is formed on the surface of the pigment-type white coloring layer to block the metal deposition layer from affecting the pigment-type white coloring layer to thereby block the pigment-type white coloring layer from being discolored and affecting the pigment-type colored coloring layer.

In the present disclosure, as the carrier film, a carrier film known in the art may be used. A preferred example may be a PET film having excellent dimensional stability, low hygroscopicity, excellent water resistance, and excellent surface smoothness and glossiness. The thickness of the PET film may be varied as needed. For example, the PET film may have a thickness of preferably 1 to 100 microns, more preferably 5 to 50 microns, and still more preferably 10 to 30 microns may be used.

In the present disclosure, as the release layer, a release agent known in the art may be used. The release layer may be formed on the upper surface of the pigment-type colored coloring layer after transfer or may remain on the surface of the carrier film. As the release agent, polyurethane series such as polyurethane, polyether polyurethane, polycarbonate polyurethane, acrylic series such as acrylic coating, cellulose, wax, or the like may be used. The release layer may be formed by applying the release agent on the carrier film in the form of a liquid coating agent.

In the present disclosure, the pigment-type colored coloring layer may be formed on the lower surface of the release layer so as to impart color to the foil.

In an embodiment of the present disclosure, the pigment-type colored coloring layer may be formed by preparing a coating solution in which organic or inorganic pigments (color pigments) implementing colors such as red, yellow, and blue are mixed with urethane or acrylic resin and a solvent together with a dispersant, and then applying the coating solution on the release layer.

In an embodiment of the present disclosure, the pigment-type colored coloring layer may be implemented in fluorescent colors other than red, yellow, and blue. When the dispersibility of the pigments is high, the use of the dispersant may be omitted.

In an embodiment of the present disclosure, the pigment-type colored coloring layer may have a thickness of 0.1 to 5 microns, preferably 0.5 to 4 microns, and more preferably 1 to 3 microns. When the thickness thereof is less than the above range, the opacity performance may be degraded. On the other hand, when the thickness thereof exceeds the above range, interlayer adhesion may be lowered, thereby causing a problem in releasability.

In the present disclosure, the pigment-type white coloring layer may be formed on the lower surface of the pigment-type colored coloring layer so as to increase the expression of the pigment-type colored coloring layer and prevent the penetration of the metal deposition layer into the pigment-type colored coloring layer.

In an embodiment of the present disclosure, the pigment-type white coloring layer may be formed by preparing a coating solution in which an inorganic pigment capable of implementing a white color, for example, a $TiO_2$-based pigment is mixed with a urethane resin or an acrylic resin and a solvent together with a dispersant, and then applying the coating solution on the pigment-type colored coloring layer.

In an embodiment of the present disclosure, the pigment-type white coloring layer may have a thickness of 0.5 to 5 microns, preferably 0.5 to 4 microns, and more preferably 1 to 3 microns. When the thickness thereof is less than the above range, the opacity performance may be degraded. On the other hand, when the thickness thereof exceeds the above range, interlayer adhesion may be lowered, thereby causing a problem in releasability.

In the present disclosure, the primer layer may be formed on the lower surface of the pigment-type white coloring layer so as to prevent the metal deposition layer from affecting the pigment-type white coloring layer.

In an embodiment of the present disclosure, the primer layer may be configured as a resin-type coating layer, for example, a coating layer made from a urethane resin or an acrylic resin. The primer layer may have a thickness of 0.1 to 3 microns, preferably 0.5 to 2 microns, and more preferably about 0.5 to 1 micron. When the thickness thereof is less than the above range, it may be difficult to block the metal deposition layer from affecting the pigment-type white coloring layer. On the other hand, when the thickness thereof exceeds the above range, there may be a problem in that cutability and releasability are lowered.

In the present disclosure, the metal deposition layer may be formed on the lower surface of the primer layer so as to block the influence of the color of the substrate on the color expression of the metal deposition layer. As the metal deposition layer, a conventional metal deposition layer may be used. A preferred example may be an aluminum deposition layer. The deposition of metal may be performed by employing a conventional deposition method.

In the present disclosure, as the adhesive layer, a conventional adhesive layer may be used. A preferred example may be an acrylic adhesive layer. In an embodiment of the present disclosure, the adhesive layer may include an anchor for increasing bonding strength with the metal deposition layer. In an embodiment of the present disclosure, the anchor layer may be configured as a resin-type coating layer, for example, a coating layer of a urethane resin or a vinyl resin.

In the present disclosure, the hot-stamped member including the pigment-type hot stamping foil may be formed by pressing the foil against the substrate to be stamped under high temperature conditions in a state in which the adhesive layer of the foil is placed on the surface of the substrate. The hot stamping foil may be transferred from the carrier film to the surface of the substrate in a heat-pressed area.

In an embodiment of the present disclosure, the substrate may have a dark color such as gray, ultramarine, and black as well as a bright color such as yellow, blue, and red.

Advantageous Effects

The present disclosure proposes a novel pigment-type hot stamping foil with excellent color expression.

The pigment-type hot stamping foil according to the present disclosure can advantageously implement a variety of colors by including pigment-type coloring layers. Furthermore, when used for a dark colored substrate, the pigment-type hot stamping foil can be free from the influence of the color of the substrate due to good opacity performance thereof, thereby achieving excellent color expression.

MODE FOR INVENTION

Hereinafter, examples of the present disclosure will be described in detail with reference to the accompanying drawings. It should be noted that the following examples are only for illustrative purposes and are not intended to limit the scope of the present disclosure.

Example 1

Figure 1:
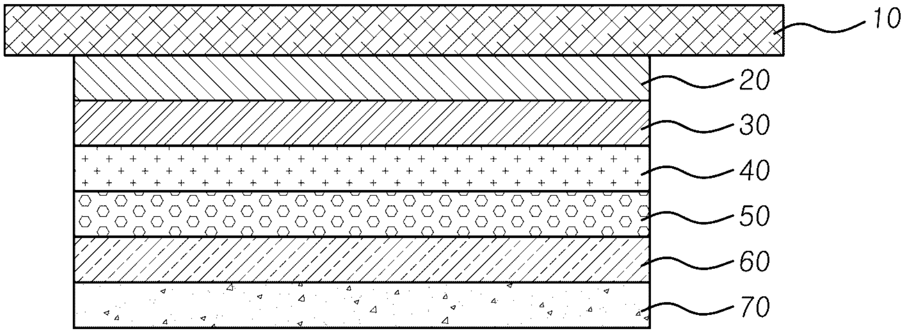
FIG. 1 is a view illustrating a layered structure of a pigment-type hot stamping foil according to an embodiment of the present disclosure.

As illustrated in FIG. 1, a pigment-type hot stamping foil 100 according to the present disclosure includes: a PET carrier film layer 10; a release layer 20 made from wax and formed on a lower surface of the carrier film layer 10; a pigment-type yellow coloring layer 30 formed on a lower surface of the release layer 20; a pigment-type white coloring layer 40 formed on a lower surface of the pigment-type yellow coloring layer 30; an acrylic primer layer 50 formed on a lower surface of the pigment-type white coloring layer 40; an aluminum deposition layer 60 formed on a lower surface of the primer layer and an acrylic adhesive layer 70 formed on a surface of the aluminum deposition layer 60.

The pigment-type hot stamping foil 100 was produced as follows: at first, wax was applied on a 15-micron-thick PET carrier film layer 10 and then dried to form a 0.5-micron-thick release layer 20. Then, a polyurethane resin and a yellow pigment were added to a methyl ethyl ketone/toluene mixed solution (2:1) together with a polyacrylate polymer type dispersant and then mixed to prepare a yellow coating solution having a concentration of 20%. The obtained yellow coating solution was applied on the release layer 20, followed by drying and curing at 180° C. for 20 seconds to form a pigment-type yellow coloring layer 30 having a thickness of 1 μm.

A polyurethane resin and a white pigment containing titanium oxide were added to a methyl ethyl ketone/toluene mixed solution (2:1) together with a polyacrylate polymer type dispersant and then mixed to prepare a white coating solution having a concentration of 20%. The obtained white coating solution was applied on the pigment-type yellow coloring layer 30, followed by drying and curing at 180° C. for 20 seconds to form a pigment-type white coloring layer 40 having a thickness of 2 μm.

After preparing a coating solution of 1 wt % using an acrylic resin and an alcohol-based solvent, the coating solution was applied on a surface of the pigment-type white coloring layer 40 to form an acrylic primer layer 50 having a thickness of 0.5 μm.

After forming a 0.03-micron-thick aluminum deposition layer 60 by depositing aluminum over a surface of the acrylic primer layer 50, a resin mixture containing 40% by weight of an acrylic resin and 60% by weight of a vinyl resin was diluted with alcohol. The diluted solution was applied on the aluminum deposition layer 60 to form an acrylic adhesive layer 70 having a thickness of 1 μm, thereby producing the pigment-type hot stamping foil 100.

Figure 2:
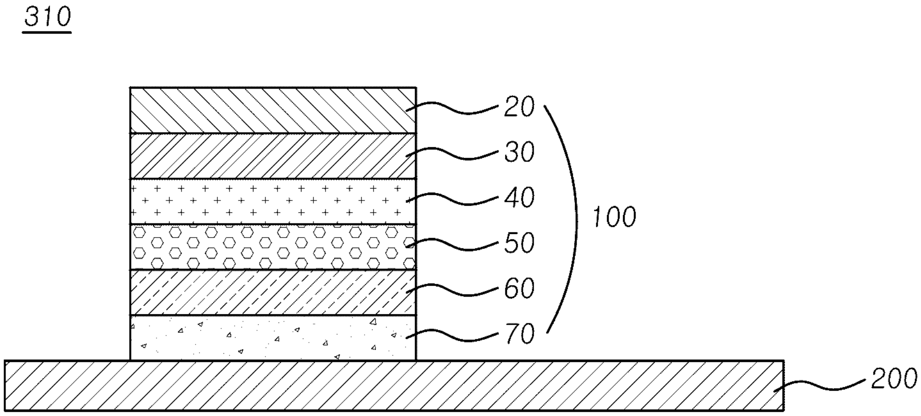
FIG. 2 is a view illustrating a layered structure of the pigment-type hot stamping foil according to the embodiment of the present disclosure in a state of being stamped on a substrate.

The pigment-type hot stamping foil 100 thus produced was stamped on a dark colored substrate 200 to produce a hot-stamped member 310 including the pigment-type hot stamping foil 100, which has the structure illustrated in FIG. 2.

Figure 6:
FIG. 6 is an image illustrating a pigment-type hot stamping foil with a light color according to Example 1 of the present disclosure.

As the substrate 200, dark paper was used. The pigment-type hot stamping foil 100 is illustrated in FIG. 6.

Figure 7:
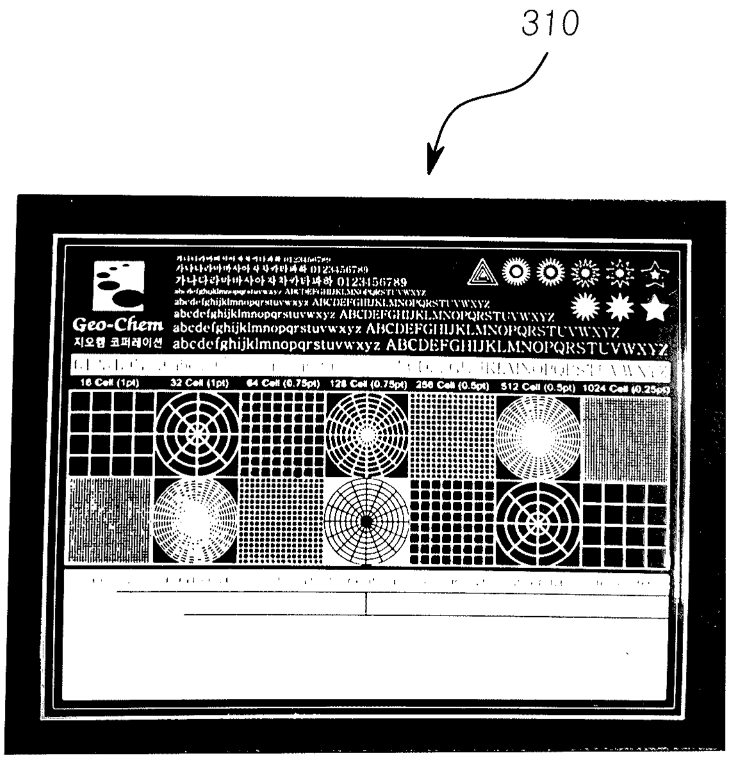
FIG. 7 is an image illustrating a hot-stamped member including a pigment-type hot stamping foil and a substrate.

FIG. 7 illustrates a hot-stamped member 310 including a pigment-type hot stamping foil 100 and a substrate 200.

Comparative Example 1—Absence of Pigment-Type White Coloring Layer

A pigment-type hot stamping foil 130 according to Comparative Example 1 was produced as follows: at first, wax was applied on a 15-micron-thick PET carrier film 10 and then dried to form a 0.5-micron-thick release layer 20. Then, a polyurethane resin and a yellow pigment were added to a methyl ethyl ketone/toluene mixed solution (2:1) together with a polyacrylate polymer type dispersant and then mixed to prepare a yellow coating solution having a concentration of 20%. The obtained yellow coating solution was applied on the release layer 20, followed by drying and curing at 180° C. for 20 seconds to form a pigment-type yellow coloring layer 30 having a thickness of 1 μm.

After preparing a coating solution of 1 wt % using an acrylic resin and an alcohol-based solvent, the coating solution was applied on a surface of the pigment-type yellow coloring layer 30 to form an acrylic primer layer 50 having a thickness of 0.5 microns.

After forming a 0.03-micron-thick aluminum deposition layer 60 by depositing aluminum over a surface of the acrylic primer layer 50, a resin mixture containing 40% by weight of an acrylic resin and 60% by weight of a vinyl resin was diluted with alcohol. The diluted solution was applied on the aluminum deposition layer 60 to form an acrylic adhesive layer 70 having a thickness of 1 μm, thereby producing the pigment-type hot stamping foil 130.

Figure 3:
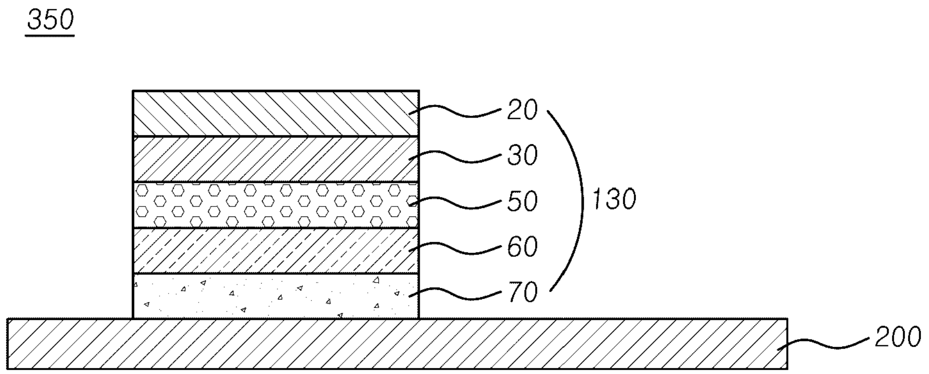
FIG. 3 is a view illustrating a layered structure of a pigment-type hot stamping foil according to Comparative Example 1 in a state of being stamped on a substrate.

The pigment-type hot stamping foil 130 thus produced was stamped on a dark colored substrate 200 to produce a hot-stamped member 350 including the pigment-type hot stamping foil 130, which has the structure illustrated in FIG. 3. After the deposition of aluminum, the light color of the pigment-type hot stamping foil 130 was faded to dark.

Comparative Example 2—Absence of Primer Layer

A pigment-type hot stamping foil 160 according to Comparative Example 2 was produced as follows: at first, wax was applied on a 15-micron-thick PET carrier film 10 and then dried to form a 0.5-micron-thick release layer 20. Then, a polyurethane resin and a yellow pigment were added to a methyl ethyl ketone/toluene mixed solution (2:1) together with a polyacrylate polymer type dispersant and then mixed to prepare a yellow coating solution having a concentration of 20%. The obtained yellow coating solution was applied on the release layer 20, followed by drying and curing at 180° C. for 20 seconds to form a pigment-type yellow coloring layer 30 having a thickness of 10 μm.

A polyurethane resin and a white pigment containing titanium oxide were added to a methyl ethyl ketone/toluene mixed solution (2:1) together with a polyacrylate polymer type dispersant and then mixed to prepare a white coating solution having a concentration of 20%. The obtained white coating solution was applied on the pigment-type yellow coloring layer 30, followed by drying and curing at 180° C. for 20 seconds to form a pigment-type white coloring layer 40 having a thickness of 2 μm.

After forming a 0.03-micron-thick aluminum deposition layer 60 by depositing aluminum over a surface of the pigment-type white coloring layer 40, a resin mixture containing 40% by weight of an acrylic resin and 60% by weight of a vinyl resin was diluted with alcohol. The diluted solution was applied on the aluminum deposition layer 60 to form an acrylic adhesive layer 70 having a thickness of 1 μm, thereby producing the pigment-type hot stamping foil 160.

Figure 4:
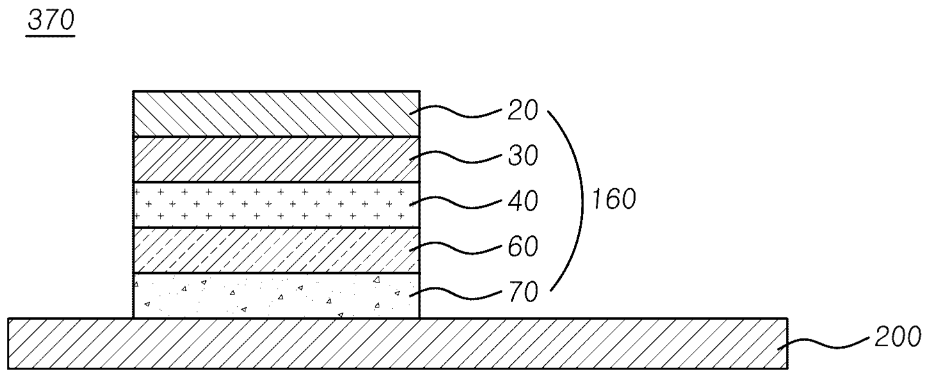
FIG. 4 is a view illustrating a layered structure of a pigment-type hot stamping foil according to Comparative Example 2 in a state of being stamped on a substrate.

The pigment-type hot stamping foil 160 thus produced was stamped on a dark colored substrate 200 to produce a hot-stamped member 370 including the pigment-type hot stamping foil 160, which has the structure illustrated in FIG. 4. After the deposition of aluminum, the light color of the pigment-type hot stamping foil 160 was faded as the pigment-type white coloring layer 40 was discolored.

Comparative Example 3—Absence of Metal Deposition Layer

A pigment-type hot stamping foil 190 according to Comparative Example 3 was produced as follows: at first, wax was applied on a 15-micron-thick PET carrier film 10 and then dried to form a 0.5-micron-thick release layer 20. Then, a polyurethane resin and a yellow pigment were added to a methyl ethyl ketone/toluene mixed solution (2:1) together with a polyacrylate polymer type dispersant and then mixed to prepare a yellow coating solution having a concentration of 20%. The obtained yellow coating solution was applied on the release layer 20, followed by drying and curing at 180° C. for 20 seconds to form a pigment-type yellow coloring layer 30 having a thickness of 1 μm.

A polyurethane resin and a white pigment containing titanium oxide were added to a methyl ethyl ketone/toluene mixed solution (2:1) together with a polyacrylate polymer type dispersant and then mixed to prepare a white coating solution having a concentration of 20%. The obtained white coating solution was applied on the pigment-type yellow coloring layer 30, followed by drying and curing at 180° C. for 20 seconds to form a pigment-type white coloring layer 40 having a thickness of 2 μm.

After preparing a coating solution of 1 wt % using an acrylic resin and an alcohol-based solvent, the coating solution was applied on a surface of the pigment-type yellow coloring layer 30 to form an acrylic primer layer 50 having a thickness of 0.5 microns.

A resin mixture containing 40% by weight of an acrylic resin and 60% by weight of a vinyl resin was diluted with alcohol. The diluted solution was applied on the acrylic primer layer 50 to form an acrylic adhesive layer 70 having a thickness of 1 μm, thereby producing the pigment-type hot stamping foil 190.

Figure 5:
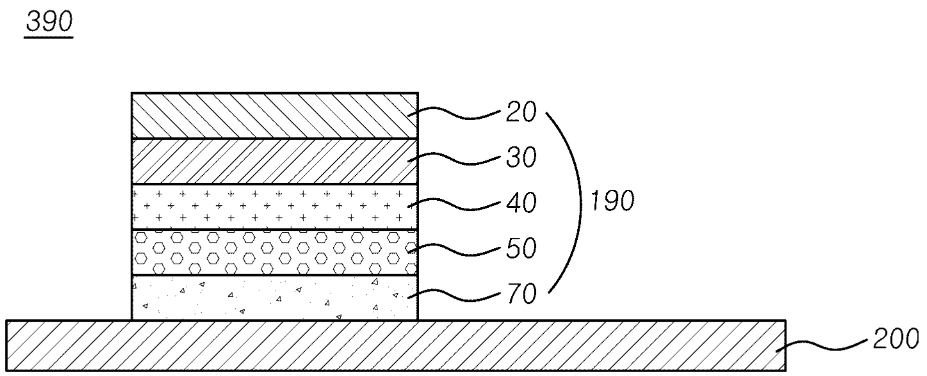
FIG. 5 is a view illustrating a layered structure of a pigment-type hot stamping foil according to Comparative Example 3 in a state of being stamped on a substrate.

The pigment-type hot stamping foil 190 thus produced was stamped on a dark colored substrate 200 to produce a hot-stamped member 390 including the pigment-type hot stamping foil 190, which has the structure illustrated in FIG. 5. The light color of the pigment-type hot stamping foil 190 was faded due to the dark color of the substrate 200.

The invention claimed is:

1. A pigment-type hot stamping foil comprising:
- a carrier film layer;
- a release layer formed on a lower surface of the carrier film layer;
- a pigment-type colored coloring layer formed on a lower surface of the release layer such that the pigment-type colored coloring layer is in direct contact with the lower surface of the release laver;
- a pigment-type white coloring layer formed on a lower surface of the pigment-type colored coloring layer;
- a primer layer formed on a lower surface of the pigment-type white coloring layer;
- a metal deposition layer formed on a lower surface of the primer layer; and
- an adhesive layer formed on a surface of the metal deposition layer,
- wherein the pigment-type white coloring layer has a thickness of 0.5 to 5 microns, and the primer layer has a thickness of 0.1 to 3 microns.

2. A method of manufacturing a pigment-type hot stamping foil, the method comprising:
- providing a carrier film layer;
- forming a release layer on a lower surface of the carrier film layer;
- forming a pigment-type colored coloring layer on a lower surface of the release layer;
- forming a pigment-type white coloring layer on a lower surface of the pigment-type colored coloring layer;
- forming a primer layer on a lower surface of the pigment-type white coloring layer;
- forming a metal deposition layer on a lower surface of the primer layer; and
- forming an adhesive layer on a lower surface of the metal deposition layer.

* * * * *